(12) United States Patent
Kang et al.

(10) Patent No.: US 10,405,693 B2
(45) Date of Patent: Sep. 10, 2019

(54) APPARATUS FOR MANUFACTURING DRINK

(71) Applicant: H&G ENGINEERING LLC, Ridgefield, NJ (US)

(72) Inventors: Steve Y. Kang, Ridgefield, NJ (US); Chang Hee Lee, Yongin-si (KR)

(73) Assignee: H&G ENGINEERING LLC, Ridgefield, NJ (US)

( * ) Notice: Subject to any disclaimer, the term of this patent is extended or adjusted under 35 U.S.C. 154(b) by 233 days.

(21) Appl. No.: 15/597,720

(22) Filed: May 17, 2017

(65) Prior Publication Data

US 2018/0332997 A1    Nov. 22, 2018

(51) Int. Cl.
| | |
|---|---|
| *A47J 31/52* | (2006.01) |
| *A47J 31/44* | (2006.01) |
| *A47J 31/60* | (2006.01) |
| *A47J 31/46* | (2006.01) |
| *A47J 31/40* | (2006.01) |
| *B01F 11/02* | (2006.01) |
| *B01F 13/10* | (2006.01) |

(52) U.S. Cl.
CPC .............. *A47J 31/52* (2013.01); *A47J 31/40* (2013.01); *A47J 31/4492* (2013.01); *A47J 31/467* (2013.01); *A47J 31/60* (2013.01); *B01F 11/0266* (2013.01); *B01F 13/1061* (2013.01)

(58) Field of Classification Search
CPC ...... C12G 3/04; B01F 3/04815; B01F 3/0092; A47J 31/52; A47J 31/40
See application file for complete search history.

(56) References Cited

U.S. PATENT DOCUMENTS

| | | | | |
|---|---|---|---|---|
| 6,669,053 B1 * | 12/2003 | Garson et al. | ....... | B67D 1/0036 222/129.1 |
| 8,757,222 B2 * | 6/2014 | Rudick et al. | ....... | B67D 1/0888 141/198 |
| 9,624,460 B2 * | 4/2017 | Wunder | ................... | C12G 3/04 |
| 10,173,881 B2 * | 1/2019 | Beavis et al. | ........ | B67D 1/0036 |
| 2009/0158937 A1 * | 6/2009 | Stearns et al. | .......... | A47J 31/41 99/280 |

(Continued)

*Primary Examiner* — Kevin L Lee
(74) *Attorney, Agent, or Firm* — Novick, Kim & Lee, PLLC; Sang Ho Lee

(57) ABSTRACT

Provided herein is an apparatus for manufacturing a drink. The apparatus for manufacturing a drink includes: an input unit receiving customer's order information; a material storing unit storing materials for manufacturing the drink therein; a drink manufacturing unit including a mixing tank receiving the materials stored in the material storing unit and mixing the received materials with each other; a drink outlet discharging the drink manufactured in the drink manufacturing unit; pipes forming connection paths for transferring the materials stored in the material storing unit to the drink manufacturing unit; valves formed in the pipes; a vacuum pump connected to the mixing tank of the drink manufacturing unit to generate vacuum in a material accommodating space formed in the mixing tank; and a controlling unit controlling the valves and the vacuum pump on the basis of the customer's order information input to the input unit to allow materials corresponding to a customer's order to be transferred to the mixing tank.

19 Claims, 8 Drawing Sheets

(56) References Cited

U.S. PATENT DOCUMENTS

2016/0090288 A1\* 3/2016 Givens, Jr. et al. ........................ B67D 1/0041
  700/283
2016/0095464 A1\* 4/2016 Jones .................. A47J 31/4403
  62/177
2019/0062138 A1\* 2/2019 Elmery ................ B67D 1/0035

\* cited by examiner

APPARATUS FOR MANUFACTURING DRINK

BACKGROUND OF THE INVENTION

1. Field of the Invention

The present invention relates to an apparatus for manufacturing a drink such as coffee, beer, latte, or the like.

2. Description of the Related Art

Generally, coffee is a favorite food enjoyed by ordinary people, and the ordinary people drink liquid coffee obtained by injecting water into grinded powders grinded from coffee beans. Recently, instant coffee that may be drunk only by diluting a coffee raw material produced in a powder form with water has been developed and widely used.

Since the instant coffee that may be drunk only by diluting the coffee raw material having the powder form with the water is manufactured, the drunk coffee may be manufactured by automatically supplying coffee powders of which a supply amount is adjusted and the water, such that coffee having a concentration desired by a user may be manufactured by an easy manipulation.

However, in the instant coffee having the powder form, it is difficult to maintain a unique taste and aroma of the coffee in a process of processing a large amount of coffee beans, and since the large amount of processed coffee beans are used, a single kind of coffee beans appropriate for an ordinary people's taste is used, such that it is difficult to produce a coffee raw material having various tastes and aromas.

In addition, recently, as coffee shops manufacturing coffee having various tastes and aromas depending on user's tastes are thriving, tastes and appetites of general consumers have become fastidious, such that coffee raw materials having various forms have been developed.

Among these coffee raw materials, a coffee raw material having an undiluted solution form diluted with warm water to manufacture coffee while maintaining various tastes and aromas has been developed and widely used. However, the coffee raw material having the undiluted solution form has a liquid state different from a state of a powder, such that it is difficult to automatically supply the coffee raw material having the undiluted solution form by a powder supplying apparatus that is previously used. Therefore, an apparatus for manufacturing coffee by supplying an undiluted coffee solution having a liquid state while accurately adjusting a supply amount of the undiluted coffee solution by a manipulation has been developed.

The apparatus for manufacturing coffee by supplying the undiluted coffee solution according to the related art is installed in a supplying portion of a tank in which the undiluted coffee solution is stored, and supplies the undiluted coffee solution through a supplying pipe at a free fall pressure by an electronic operation to allow the undiluted coffee solution to be diluted with warm water.

The apparatus for manufacturing coffee by supplying the undiluted coffee solution according to the related art supplies the undiluted coffee solution by free fall, but the free fall pressure is significantly changed depending on air pressure depending on weather and a place, a head drop, and an amount of supplied undiluted coffee solution, such that a speed and an amount of the supplied undiluted coffee solution are changed. That is, the undiluted coffee solution has viscosity, such that when the undiluted coffee solution is supplied at a low pressure, an amount of the supplied undiluted coffee solution is insufficient, and when the undiluted coffee solution is supplied at a high pressure, the undiluted coffee solution is excessively supplied. In addition, when a supply amount of the undiluted coffee solution stored in the tank is large, a mass of the undiluted coffee solution itself is large, such that the free fall speed is increased, when an amount of the undiluted coffee solution received in the tank is decreased due to continuous supply of the undiluted coffee solution, the free fall speed is continuously decreased in proportion to the amount of the undiluted coffee solution, such that a supply amount of the undiluted coffee solution is rapidly decreased.

In addition, in the apparatus for manufacturing coffee by supplying the undiluted coffee solution according to the related art, since the undiluted coffee solution having the viscosity is supplied through the supplying pipe, the undiluted coffee solution may be introduced into coffee in a state in which it is stuck to an inner surface of the supplying pipe to be thus polluted, such that an inner portion of the supplying pipe should be washed in a stop state in a preset time.

Therefore, recently, an apparatus for supplying the undiluted coffee solution at a pressure of a pump installed in order to constantly supply the undiluted coffee solution without a change in a pressure has been disclosed and used.

However, the pump should be installed at a position at which the undiluted coffee solution is supplied, such that the apparatus becomes complicated and a volume of the apparatus is increased.

In addition, the pump is instantaneously operated only at the instant of the dilution of the undiluted coffee solution, and the pump is again maintained in a stop state after the supplying of the undiluted coffee solution. Therefore, the pump is irregularly operated, such that many faults occur, and a pulsation phenomenon occurs due to an intermittent operation of the pump, such that a supply amount of the undiluted coffee solution is not constant.

SUMMARY OF THE INVENTION

An object of the present invention is to provide an apparatus for manufacturing a drink capable of automatically manufacturing a drink corresponding to input order information when customer's order information is input.

According to an exemplary embodiment of the present invention, an apparatus for manufacturing a drink may include: an input unit receiving customer's order information; a material storing unit storing materials for manufacturing the drink therein; a drink manufacturing unit including a mixing tank receiving the materials stored in the material storing unit and mixing the received materials with each other; a drink outlet discharging the drink manufactured in the drink manufacturing unit; pipes forming connection paths for transferring the materials stored in the material storing unit to the drink manufacturing unit; valves formed in the pipes; a vacuum pump connected to the mixing tank of the drink manufacturing unit to generate vacuum in a material accommodating space formed in the mixing tank; and a controlling unit controlling the valves and the vacuum pump on the basis of the customer's order information input to the input unit to allow materials corresponding to a customer's order to be transferred to the mixing tank.

The material storing unit may include: a liquid storage storing at least one liquid for manufacturing the drink therein; and a gas generator generating at least one of a nitrogen gas and an oxygen gas, and a regulator may be installed at a discharging end of the gas generated in the gas generator.

The liquid may include at least one of an undiluted coffee solution, water, milk, beer, and juice.

The apparatus for manufacturing a drink may further include a material storing unit sensing sensor formed at a lower end of the material storing unit and sensing a weight of the material storing unit, wherein the controlling unit generates a notifying signal notifying a user of whether or not the material storing unit is installed and states of the stored materials on the basis of sensed data of the material storing unit sensing sensor.

The apparatus for manufacturing a drink may further include a cup sensing sensor generating sensed data on a cup holding the drink manufactured in the drink manufacturing unit, wherein the controlling unit generates a notifying signal notifying a user of whether or not the cup is put in the drink outlet and a size of the put cup on the basis of the data sensed in the cup sensing sensor.

The apparatus for manufacturing a drink may further include a barcode sensor reading a barcode attached to a cup to generate sensed data, wherein the controlling unit determines a kind and a size of drink ordered by a customer on the basis of the data sensed in the barcode sensor, and controls the drink manufacturing unit to manufacture the drink corresponding to the customer's order.

In the case in which the apparatus for manufacturing a drink is implemented by an apparatus for manufacturing coffee, the drink manufacturing unit may include a first drink manufacturing unit that uses milk as a material and a second drink manufacturing unit that does not use the milk as a material.

The drink manufacturing unit may include at least one of an ultrasonic generator transferring ultrasonic waves to the materials stored in the material accommodating space of the mixing tank; and a mixer mixing the materials stored in the material accommodating space of the mixing tank with each other using a torque by a motor.

In the case in which a customer orders nitro coffee, the controlling unit may control the valves to transfer an undiluted coffee solution, water, and a nitrogen gas to the mixing tank, and may control the ultrasonic generator to provide the ultrasonic waves to the materials stored in the material accommodating space of the mixing tank when the materials are transferred to the mixing tank.

In the case in which an automatic cleaning mode is input through the input unit, the controlling unit may perform a control to perform a first cleaning process of transferring water stored in the material storing unit from the material storing unit toward the mixing tank, may control at least one of the ultrasonic generator and the mixer to perform a second cleaning process when the water is transferred into the mixing tank, may control the drink outlet to perform a third cleaning process of discharging water used for washing when an inner surface of the mixing tank is washed depending on the second cleaning process, and may perform a control to perform a fourth cleaning process of disinfecting the pipes and the mixing tank using a nitrogen gas.

DETAILED DESCRIPTION

Figure 1:
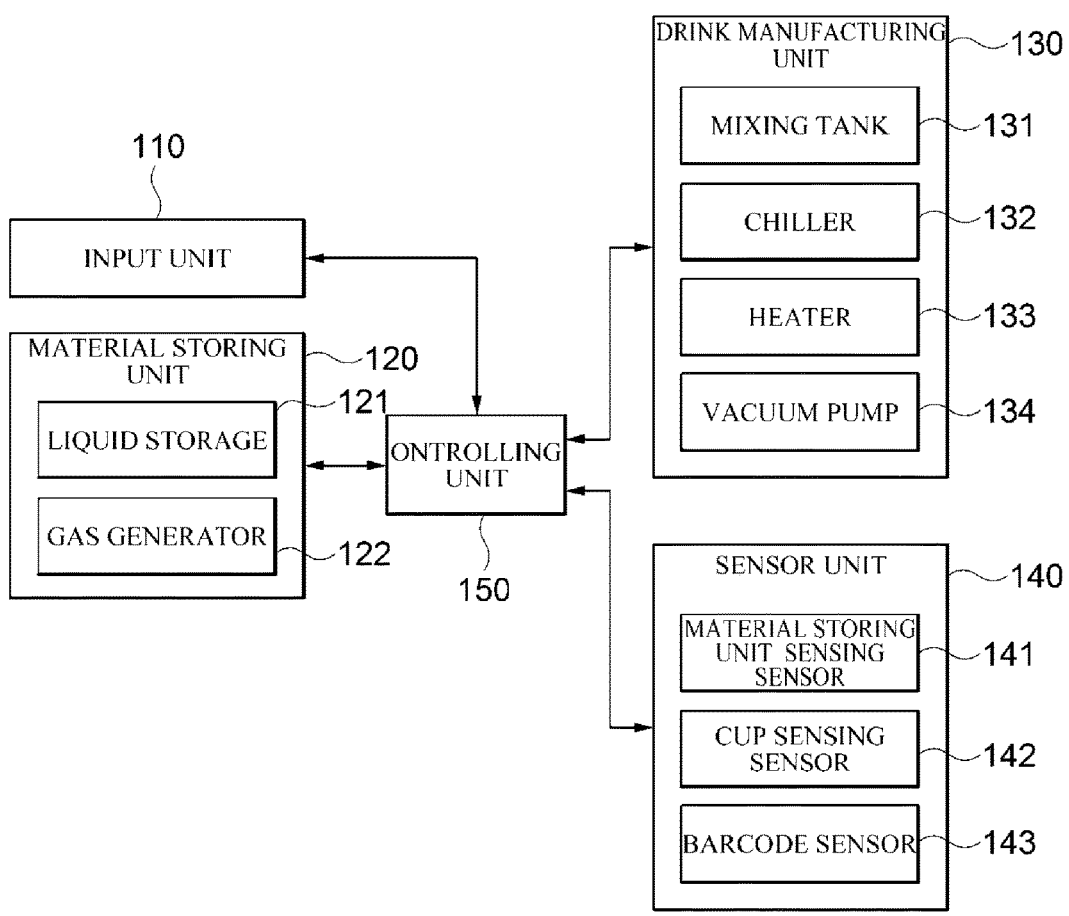
FIG. 1 is a block diagram illustrating an apparatus for manufacturing a drink according to an exemplary embodiment of the present invention.

Technical configurations of an apparatus for manufacturing a drink according to the present invention for accomplishing the abovementioned objects and acting effects thereof will be clearly understood by the following detailed description in which exemplary embodiments of the present invention are described with reference to the accompanying drawings.

Advantages and features of the present invention and technologies accomplishing them will become apparent from exemplary embodiments described in detail below with reference to the accompanying drawings. However, the present invention is not limited to exemplary embodiments set forth herein, but may be modified in various different forms. These exemplary embodiments may be provided in order to make the disclosure of the present invention complete and allow those skilled in the art to which the present invention pertains to completely recognize the scope of the present invention. Throughout the specification, like reference numerals denote like elements.

For the purpose of simplification and clarity of illustration, a general configuration scheme will be illustrated in the accompanying drawings, and a detailed description for the feature and the technology well-known in the art will be omitted in order to prevent the discussion of exemplary embodiments of the present invention from being unnecessarily obscure. Additionally, components in the accompanying drawings are not necessarily drawn to scale. For example, sizes of some of the components illustrated in the accompanying drawings may be exaggerated as compared with other components in order to assist in the understanding of exemplary embodiments of the present invention. Like reference numerals on different drawings will denote like components, and similar reference numerals on different drawings will denote similar components, but are not necessarily limited thereto.

Hereinafter, exemplary embodiments of the present invention will be described in detail with reference to the accompanying drawings. The same reference numerals will be used to describe the same or similar components, independent of the reference numerals and an overlapped description of the same components will be omitted.

When it is determined that the detailed description of the known art related to the present invention may obscure the gist of the present invention, the detailed description thereof will be omitted.

FIG. 1 is a block diagram illustrating an apparatus for manufacturing a drink according to an exemplary embodiment of the present invention. Referring to FIG. 1, the apparatus 100 for manufacturing a drink may include all or some of an input unit 110, a material storing unit 120, a drink manufacturing unit 130, a sensor unit 140, and a controlling unit 150.

The input unit 110 may receive customer's order information. In more detail, when the customer orders a kind and a size of drink, a worker may input the customer's order information through the input unit 110.

Here, a kind of drink that may be ordered by a customer may be changed according to an implementation of the apparatus for manufacturing a drink. As an example, in the case in which the input unit 110 is implemented to include a display means, the display means may display operation modes that may be selected by a user. Here, the operation modes may include a coffee manufacturing mode for manufacturing coffee, a beer manufacturing mode for manufacturing beer, a juice manufacturing mode for manufacturing juice, an automatic cleaning mode for automatically cleaning a device, and the like. In the coffee manufacturing mode, a kind of drink that may be ordered by the customer may include iced Americano, hot Americano, iced Latte, hot Latte, beer, nitro coffee, bubble coffee, and the like.

Such an input unit 110 may include all or some of a user input unit and a microphone unit. As an example, the user input unit may receive a user input such as a touch, a push operation, or the like. Here, the user input unit may be implemented by at least one of a form of various buttons, a touch sensor receiving a touch input, and a proximity sensor receiving a proximity motion, or implemented by an external input apparatus such as a keyboard, a mouse, or the like. The microphone unit may receive a speech of the user and a sound generated in the inside and the outside of the vehicle.

The material storing unit 120 may store materials for manufacturing the drink therein. In more detail, the material storing unit 120 may include a liquid storage 121 storing a liquid for manufacturing the drink therein and a gas generator 122 generating a gas. As an example, in the case in which the apparatus for manufacturing a drink is implemented by an apparatus for manufacturing coffee, the liquid storage 121 may include an undiluted coffee solution storage, a water storage, and a milk storage. In addition, the gas generator 122 may include a nitrogen gas generator generating a nitrogen gas and an oxygen gas generator generating an oxygen gas. As another example, in the case in which the apparatus for manufacturing a drink is implemented by an apparatus for manufacturing beer, the liquid storage 121 may include a beer storage, and the gas generator 122 may include a nitrogen gas generator generating a nitrogen gas and an oxygen gas generator generating an oxygen gas.

Such a material storing unit 120 may be implemented in a form of a container or a keg. In addition, the material storing unit 120 may be installed in a refrigerator in a state in which it contains materials therein in order to prevent rot and spoilage of a liquid.

The drink manufacturing unit 130 may receive the materials stored in the material storing unit 120, and manufacture the drink. Such a drink manufacturing unit 130 may include all or some of a mixing tank 131, a chiller 132, a heater 133, a vacuum pump 134, a drink outlet 135, an ultrasonic generator 136, a mixer 137, and coolers 138:138-1 and 138-2. Here, the drink manufacturing unit 130 and the material storing unit 120 may be connected to each other through pipes. That is, the pipes may form connection paths for transferring the materials stored in the material storing unit 120 to the mixing tank 131 of the drink manufacturing unit 130.

The number of drink manufacturing units 130 may be plural according to an implementation of the apparatus 100 for manufacturing a drink. As an example, in the case in which the apparatus for manufacturing a drink is implemented by the apparatus for manufacturing coffee, the drink manufacturing unit 130 may include a latte manufacturer manufacturing latte and an Americano manufacturer manufacturing Americano. As another example, in the case in which the apparatus for manufacturing a drink is implemented by an apparatus for manufacturing beer and juice, the drink manufacturing unit 130 may include a juice manufacturer manufacturing juice and a beer manufacturer manufacturing beer.

The mixing tank 131 may receive the materials stored in the material storing unit 120 through the pipes. In addition, a material accommodating space having a predetermined size may be formed in the mixing tank 131, and the received materials may be mixed with each other in the corresponding space.

The vacuum pump 134 may be connected to the material accommodating space of the mixing tank 131 to generate vacuum in the material accommodating space. In detail, the vacuum pump 134 may suck and compress gas molecules in the material accommodating space and release the compressed gas molecules into the atmosphere to raise a vacuum level in the space. Such a vacuum pump 134 may be implemented by a mechanical vacuum pump, an ejection pump (an ejector), a diffusion pump, and the like. An example of the mechanical vacuum pump includes a piston pump, a rotary pump, and the like, using actions such as reciprocation, rotation, and the like, of a machine, and the mechanical vacuum pump may pump a gas in a container, compress the pumped gas at an atmospheric pressure or a pressure slightly higher than the atmospheric pressure, and discharge the compressed gas. The piston pump may be implemented by two types such as a free valve and a slide valve. In addition, the rotary pump may be implemented by a multi-blade rotary pump, a Nash pump, a rotary vacuum pump, or the like.

The chiller 132 may lower a temperature of the drink manufactured in the mixing tank 131. In detail, the chiller 132 may take away heat from the drink manufactured in the mixing tank 131 to lower the temperature of the manufactured drink. Here, the chiller 132 may be implemented by a water cooling chiller.

The heater 133 may raise a temperature of the drink manufactured in the mixing tank 131. In detail, the heater 133 may apply heat to the drink manufactured in the mixing tank 131 to raise the temperature of the manufactured drink.

Such a drink manufacturing unit 130 may manufacture a drink corresponding to a customer's order using all or some of the mixing tank 131, the chiller 132, the heater 133, and the vacuum pump 134. As an example, in the case in which the customer orders iced Americano, the mixing tank 131 in a vacuum state may receive an undiluted coffee solution stored in the undiluted coffee solution storage and water stored in the water storage and mix the undiluted coffee solution and the water with each other, and the chiller 132 may lower a temperature of the drink manufactured in the mixing tank 131 to manufacture the iced Americano. As another example, in the case in which the customer orders iced nitro coffee, a nitrogen gas generated in the nitrogen gas generator may be sprayed to the pipes at a high pressure and is transferred to the mixing tank 131, and the undiluted coffee solution stored in the undiluted coffee solution storage and the water stored in the water storage may be transferred to the mixing tank 131 in the vacuum state while being mixed with each other in the pipes. In addition, the mixing tank 131 may mix the transferred undiluted coffee solution, the water, the nitrogen gas with one another, and the chiller 132 may lower a temperature of the drink manufactured in the mixing tank 131 to manufacture the iced nitro coffee.

Meanwhile, the sensor unit 140 may sense various data for an operation of the apparatus 100 for manufacturing a drink. Such a sensor unit 140 may include all or some of a material storing unit sensing sensor 141, a cup sensing sensor 142, and a barcode sensor 143.

The material storing unit sensing sensor 141 may generate sensed data on the material storing unit 120, and transmit the generated sensed data to the controlling unit 150. As an example, the material storing unit sensing sensor 141 may be implemented by a weight sensing sensor formed at a lower end of the material storing unit 120 and sensing a weight of the material storing unit 120. In this case, the data sensed in the material storing unit sensing sensor 141 may be transmitted to the controlling unit 150, and the controlling unit 150 may generate a notifying signal notifying the user of whether or not the material storing unit 120 is installed and states of the stored materials (for example, how much the materials remain) on the basis of the sensed data.

The cup sensing sensor 142 may generate sensed data on a cup holding the manufactured drink, and transmit the generated sensed data to the controlling unit 150. As an example, the cup sensing sensor 142 may be implemented by a light emitting sensor and a light receiving sensor formed on one surface of a housing of the drink manufacturing unit. In this case, the cup sensing sensor 142 may emit light toward the cup, and transmit light reception data on the emitted light to the controlling unit 150. The controlling unit 150 may generate a notifying signal notifying the user of whether or not the cup is put in the drink outlet and a size of the put cup on the basis of the data sensed in the cup sensing sensor 142.

The barcode sensor 143 may read a barcode attached to the cup to generate sensed data, and transmit the generated sensed data to the controlling unit 150. Here, the barcode may include a one-dimensional barcode in which information is arranged in one direction, a two-dimensional barcode (for example, a quick response (QR) code) in which information is arranged into two directions (a horizontal direction and a vertical direction). A kind of drink ordered by the customer, a size of the drink, and the like, may be recorded in such a barcode. In this case, the barcode sensor 143 may be implemented by an optical barcode sensor as an example, and read a barcode attached to the cup to generate sensed data and transmit the generated sensed data to the controlling unit 150. The controlling unit 150 may determine the kind and the size of drink ordered by the customer on the basis of the data sensed in the barcode sensor 143, and may control components of the apparatus for manufacturing a drink to manufacture the drink corresponding to the customer's order.

In the case of using such a barcode sensor 143, complete automation that the drink may be ordered and manufactured in an environment in which a worker is not present may be implemented. As an example, when the customer inputs his/her order details through the input unit, the apparatus for manufacturing a drink may print a barcode including information corresponding to the customer's order details to output the barcode to paper or transmit a barcode including the corresponding order details to a smartphone of the customer. In this case, the customer may read the barcode in the barcode sensor 143, and the apparatus for manufacturing a drink may automatically manufacture a drink corresponding to the customer's order details.

Meanwhile, the controlling unit 150 may control a general operation of the apparatus 100 for manufacturing a drink. In detail, the controlling unit 150 may control all or some of the input unit 110, the material storing unit 120, the drink manufacturing unit 130, and the sensor unit 140.

Particularly, the controlling unit 150 may control at least one of valves and vacuum pumps on the basis of the customer's order information input to the input unit 110 to allow materials corresponding to the customer's order to be transferred to the drink manufacturing unit. As an example, the controlling unit 150 may determine a vacuum state of the material accommodating space of the mixing tank 131, and may control the valves corresponding to the customer's order to be opened or closed to allow the materials corresponding to the customer's order to be transferred to the drink manufacturing unit when it is determined that the material accommodating space is in the vacuum state.

In addition, the controlling unit 150 may generate a notifying signal using the sensed data of the sensor unit 140. Such a notifying signal may be modified into a data form that may be expressed to a person through a display means, a speaker, or the like. As an example, when the controlling unit 150 generates the notifying signal notifying the user of whether or not the cup is put in the drink outlet and the size of the put cup, the display means may display whether or not the cup is put and the size of the put cup on a screen.

The structure of the apparatus 100 for manufacturing a drink according to an exemplary embodiment of the present invention described above will be described in more detail with reference to FIGS. 2 to 6.

Figure 2:
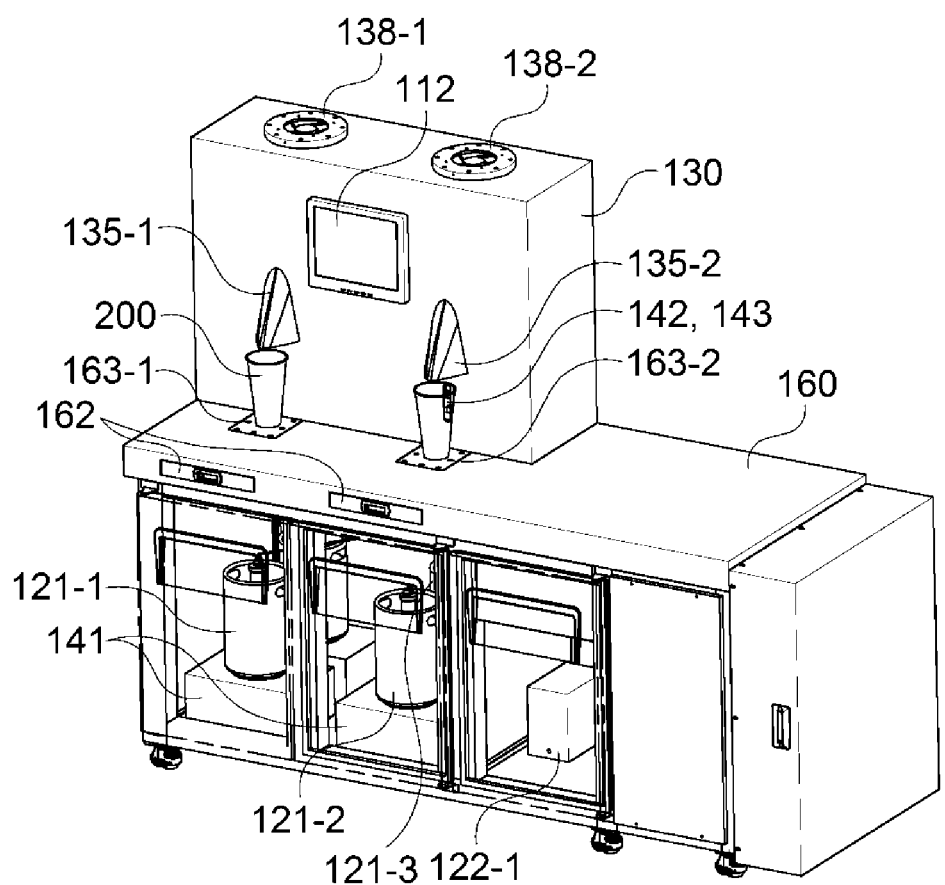
FIG. 2 is a front perspective view illustrating the apparatus for manufacturing a drink according to an exemplary embodiment of the present invention.
Figure 3:
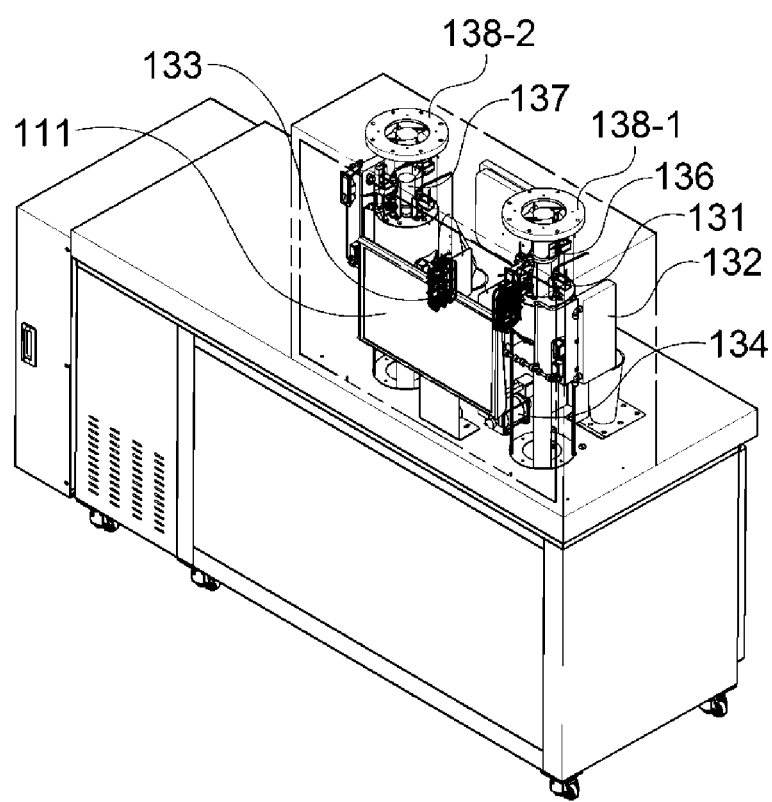
FIG. 3 is a rear perspective view illustrating the apparatus for manufacturing a drink according to an exemplary embodiment of the present invention.
Figure 4:
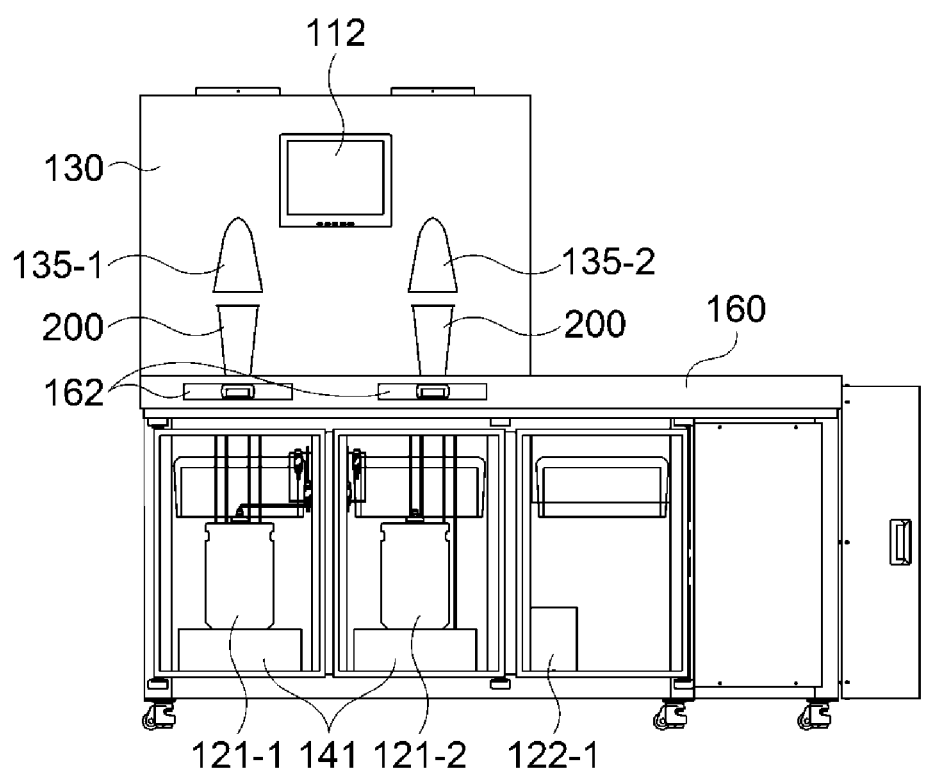
FIG. 4 is a front view illustrating the apparatus for manufacturing a drink according to an exemplary embodiment of the present invention.
Figure 5:
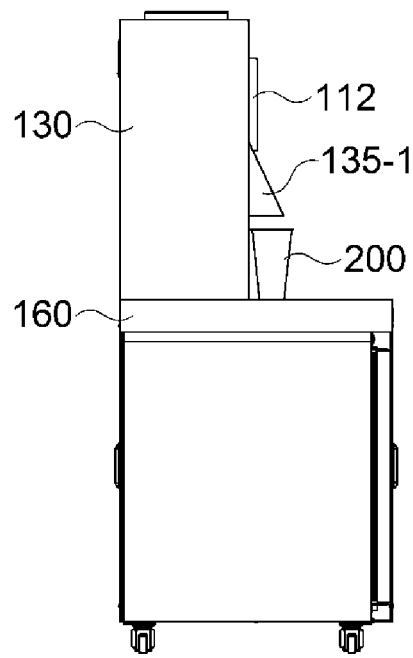
FIG. 5 is a side view illustrating the apparatus for manufacturing a drink according to an exemplary embodiment of the present invention.
Figure 6:
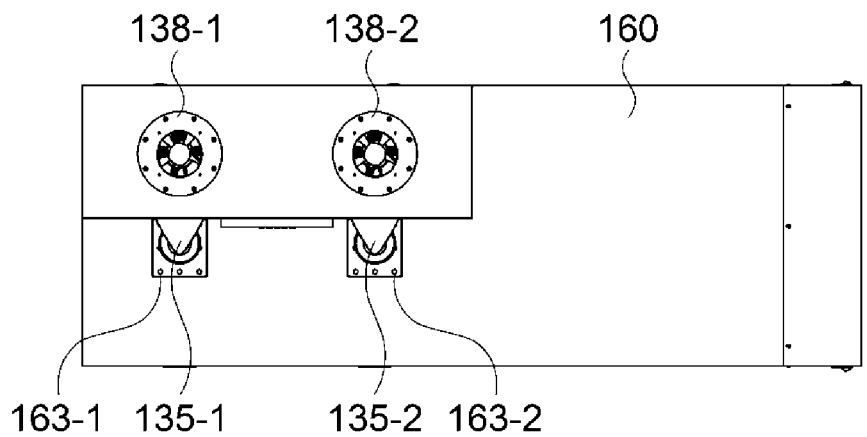
FIG. 6 is a plan view illustrating the apparatus for manufacturing a drink according to an exemplary embodiment of the present invention.

FIG. 2 is a front perspective view illustrating the apparatus for manufacturing a drink according to an exemplary embodiment of the present invention. FIG. 3 is a rear perspective view illustrating the apparatus for manufacturing a drink according to an exemplary embodiment of the present invention. FIG. 4 is a front view illustrating the apparatus for manufacturing a drink according to an exemplary embodiment of the present invention. FIG. 5 is a side view illustrating the apparatus for manufacturing a drink according to an exemplary embodiment of the present invention. FIG. 6 is a plan view illustrating the apparatus for manufacturing a drink according to an exemplary embodiment of the present invention.

Referring to FIGS. 2 to 7, the input unit 110 receiving the customer's order information may be implemented in a form in which a display unit displaying a screen and a user input unit receiving a user input such as a touch, a push operation, or the like, are combined with each other. In addition, the input unit 110 may include a first input unit 111 through which the customer directly inputs his/her order content and a second input unit 112 through which a worker receives the order content from the customer and inputs the customer's order content.

In addition, the material storing unit 120 storing the materials for manufacturing the drink therein may include the liquid storage 121 and the gas generator 122 generating the gas. As an example, the liquid storage 121 may include the undiluted coffee solution storage 121-1, the water storage 121-2, and the milk storage 121-3. In addition, the gas generator 122 may include the nitrogen gas generator 122-1 generating the nitrogen gas.

Such a material storing unit 120 may be installed in the refrigerator 160 in a state in which the materials are contained in a keg in order to prevent the rot and the spoilage of the liquid. That is, a space for storing the materials in a low temperature state may be formed in the refrigerant 160, and the material storing unit 120 may be installed in such a space. In addition, a control panel may be formed in the refrigerator 160, and a temperature of an internal space of the refrigerator, power on/off of the refrigerator, and the like, may be input through the control panel.

In addition, the input units 111 and 112 and the drink manufacturing unit 130 may be formed above the refrigerator 160. In addition, a plurality of holes 163-1 and 163-2 may be formed, respectively, on portions of an upper surface of the refrigerator facing drink outlets 135-1 and 135-2: 135 of the drink manufacturing unit 130. A drink that is not held in cups 200 in the drink discharged from the drink outlets 135 may be held in draining boxes 162 of the refrigerator 160 through the plurality of holes 163-1 and 163-2: 163.

Meanwhile, the material storing unit sensing sensors 141 sensing a weight of the material storing unit 120 may be installed at a lower end of the material storing unit 120. In this case, the data sensed in the material storing unit sensing sensors 141 may be transmitted to the controlling unit 150, and the controlling unit 150 may generate a notifying signal notifying the user of whether or not the material storing unit 120 is installed and states of the stored materials (for example, how much the materials remain) on the basis of the sensed data.

The drink manufacturing unit 130 may receive the materials stored in the material storing unit 120, and manufacture the drink. Here, the drink manufacturing unit 130 and the material storing unit 120 may be connected to each other through the pipes 170. That is, the pipes 170 may form a plurality of connection paths for transferring the materials stored in the material storing unit 120 to the mixing tank 131 of the drink manufacturing unit 130. In addition, valves 171 controlling each of the plurality of connection paths to be opened or closed may be formed in the pipes 170.

Such a drink manufacturing unit 130 may include all or some of the mixing tank 131, the chiller 132, the heater 133, the vacuum pump 134, the drink outlet 135, the ultrasonic generator 136, the mixer 137, and the coolers 138: 138-1 and 138-2. All or some of the components of the drink manufacturing unit 130 may be selectively used depending on a kind of drink manufactured in the drink manufacturing unit 130.

In more detail, the drink manufacturing unit 130 may be divided into a plurality of drink manufacturing units depending on a kind of manufactured drink. As an example, in the case in which the apparatus 100 for manufacturing a drink is implemented by the apparatus for manufacturing coffee, when latte that uses milk as a material and Americano that does not use the milk as a material are manufactured by the same manufacturing unit, it is difficult to secure quality of the manufactured Americana due to an influence of the milk. Therefore, in the case in which the apparatus 100 for manufacturing a drink is implemented by the apparatus for manufacturing coffee, the drink manufacturing unit 130 may include a first drink manufacturing unit that uses the milk as a material and a second drink manufacturing unit that does not use the milk as a material. In this case, the first drink manufacturing unit that uses the milk as the material may include the mixing tank 131, the chiller 132, the heater 133, the vacuum pump 134, the drink outlet 135, the mixer 137, and the cooler 138. In addition, the second drink manufacturing unit that does not use the milk as the material may include the mixing tank 131, the chiller 132, the heater 133, the vacuum pump 134, the drink outlet 135, the ultrasonic generator 136, and the cooler 138. That is, the first drink manufacturing unit that uses the milk as the material may include the mixer 137 instead of the ultrasonic generator 136. In addition, the second drink manufacturing unit that does not use the milk as the material may include the ultrasonic generator 136 instead of the mixer 137.

Meanwhile, the mixing tank 131 may receive the materials stored in the material storing unit 120 through the pipes 170. In addition, the material accommodating space having a predetermined size may be formed in the mixing tank 131, and the received materials may be mixed with each other in the corresponding space.

In this case, a process in which the materials stored in the material storing unit 120 are transferred to the mixing tank 131 through the pipes 170 may be performed using a pressure difference. In detail, the vacuum pump 134 may be connected to the mixing tank 131 to generate vacuum in the material accommodating space in the mixing tank 131 and pipes that are in the vicinity of the mixing tank 131. That is, the vacuum pump 134 may suck and compress the gas molecules in the material accommodating space and release the compressed gas molecules into the atmosphere to raise the vacuum level in the space. Therefore, when the liquid storage 121 sprays a liquid to the pipes through nozzles or the gas generator 122 sprays a gas to the pipes through nozzles, the sprayed liquid and/or gas may be transferred to the mixing tank 131 through the pipes 170 depending on a pressure difference therebetween. In addition, the materials transferred to the mixing tank 131 may be mixed with each other in the material accommodating space.

Meanwhile, the chiller 132 may take away heat from the drink manufactured in the mixing tank 131 to lower the temperature of the manufactured drink.

In addition, the heater 133 may apply heat to the drink manufactured in the mixing tank 131 to raise the temperature of the manufactured drink.

In addition, the drink outlet 135 may discharge the manufactured drink to the cup 200.

Meanwhile, the cup sensing sensors 142 including the light emitting sensor and the light receiving sensor may be installed on one surface of the housing 139 of the drink manufacturing unit. The cup sensing sensors 142 may emit light toward the cups, and transmit light reception data on the emitted laser beam to the controlling unit 150. The controlling unit 150 may generate a notifying signal notifying the user of whether or not the cups are put in the drink outlets and sizes of the put cups on the basis of the data sensed in the cup sensing sensors 142.

In addition, the barcode sensors 143 reading barcodes attached to the cups may be installed on one surface of the housing 139 of the drink manufacturing unit. The barcode sensors 143 may read the barcode attached to the cups to generate sensed data, and transmit the generated sensed data to the controlling unit 150. The controlling unit 150 may determine the kind and the size of drink ordered by the customer on the basis of the data sensed in the barcode sensors 143, and may control components of the apparatus for manufacturing a drink to manufacture the drink corresponding to the customer's order.

In addition, the coolers 138 may be installed on the housing 139 of the drink manufacturing unit, and cool heat in the housing of the drink manufacturing unit. These coolers 138 may be implemented by a cooling fan as an example.

Meanwhile, the ultrasonic generator 136 may generate ultrasonic waves to help nitrogen be mixed with other materials. In detail, since nitrogen is not substantially dissolved in water, even though a drink using nitrogen as a material, such as nitro coffee, is manufactured using a mixer mixing materials with each other using a torque, it is difficult to secure quality of the drink. However, according to the present invention, when the materials including nitrogen are transferred to the mixing tank 131, the ultrasonic generator 136 may transfer the ultrasonic waves to the materials stored in the material accommodating space of the mixing tank 131, which helps nitrogen be dissolved in other materials, thereby making it possible to allow the materials stored in the mixing tank 131 to be more smoothly mixed with each other. Furthermore, when a liquid for cleaning is transferred to the mixing tank 131 in an automatic cleaning mode to be described below, the ultrasonic generator 136 may apply the ultrasonic waves to the liquid transferred to the mixing tank 131 to deeply clean a surface and an inner portion of a washed article having the liquid held therein or in contact with the liquid. The ultrasonic generator 136 may be installed in a drink manufacturing unit manufacturing the drink using nitrogen as a material among a plurality of drink manufacturing units 130.

In addition, the mixer 137 may help the materials stored in the material accommodating space of the mixing tank 131 be mixed with each other using a torque by a motor. Furthermore, the mixer 137 may help an inner portion of the mixing tank 131 be cleaned using the torque by the motor in an automatic cleaning mode to be described below. The mixer 137 may be installed in a drink manufacturing unit manufacturing the drink by mixing the materials with each other among the plurality of drink manufacturing units 130.

Meanwhile, the apparatus for manufacturing a drink according to an exemplary embodiment of the present invention may include an automatic cleaning mode for automatically cleaning a device as well as a drink manufacturing mode for manufacturing the drink such as the iced coffee, the nitro coffee, or the like, described above.

That is, in the existing scheme, disassembling and assembling processes of a machine needs to be performed in order to clean an inner portion of the machine, and a fault may thus occur due to an assembling defect, or the like, at the time of reassembling the machine, which may lead to suspension of sale, thereby hurting sales, and a machine that may not be disassembled is washed by a person using a brush, and it is thus difficult to precisely wash the machine, resulting in a sanitary problem.

However, according to the present invention, the automatic cleaning mode is provided, thereby making it possible to solve the problems occurring in the related art. In more detail, when the automatic cleaning mode is selected through the input unit 110, the controlling unit 150 may control an operation of the vacuum pump 134 and control the valves 171 be opened or closed in order to perform a first cleaning process of transferring the water stored in the material storing unit 120 from the material storing unit 120 to the mixing tank 131. That is, in order to perform the first cleaning process, the controlling unit 150 may control valves formed in paths of the water to be opened, and control an inner portion of the mixing tank 131 to be vacuum, thereby making it possible to allow the water to be transferred toward the mixing tank 131. Therefore, the water may be transferred from the material storing unit 120 into the mixing tank 131.

When the water is transferred into the mixing tank 131 depending on the first cleaning process, the controlling unit 150 may control at least one of the ultrasonic generator 136 and the mixer 137 to allow a second cleaning process to be performed.

In detail, when the water for the cleaning is transferred into the mixing tank 131, the ultrasonic generator 136 may apply the ultrasonic waves to the water transferred into the mixing tank 131. In this case, micro-bubbles may be generated in the water. These micro-bubbles may generate strong energy while being grown and destroyed, and an inner surface of the mixing tank 131 held in the water may be washed by this shock wave.

In addition, when the water for the cleaning is transferred into the mixing tank 131, the mixer 137 may apply a torque generated depending on rotation of the motor to the water. In this case, the water may clean the inner surface of the mixing tank 131 held in the water while being rotated around a predetermined region.

Meanwhile, when the inner surface of the mixing tank 131 is washed depending on the second cleaning process, the controlling unit 150 may perform a control to perform a third cleaning process of discharging the water used for the cleaning. In detail, when the inner surface of the mixing tank 131 is washed depending on the second cleaning process, the controlling unit 150 may control valves formed in drink discharging paths to be opened to discharge the water used for the cleaning to the outside.

In addition, when the water used for the cleaning is discharged depending on the third cleaning process, the controlling unit 150 may perform a control to perform a fourth cleaning process of cleaning the pipes 170 and the drink manufacturing unit 130 using a nitrogen gas having a disinfection function. In detail, the controlling unit 150 may control the valves 171 formed in the pipes 170 that need to be cleaned to be opened and control an inner portion of the mixing tank 131 to be vacuum to allow the nitrogen gas to be transferred from the nitrogen gas generator 122-1 toward the mixing tank 131 through the pipes 170. The nitrogen gas used for the disinfection may be discharged to the outside through the drink outlet 135.

In addition, the controlling unit 150 may control the related components to sequentially and repeatedly perform the first cleaning process, the second cleaning process, the third cleaning process, and the fourth cleaning process.

According to the automatic cleaning mode of the present invention described above, cleaning may be performed on inner surfaces of the pipes, the inner surface of the mixing tank, and the like, in a process of discharging the water for the cleaning from the material storing unit 120 to the drink outlet 135 through the mixing tank 131.

According to the present invention described above, the cleaning may be automatically performed by only selection of the mode by the worker to secure continuous sanitation, and an equipment does not need to be disassembled and assembled, such that durability of the equipment may be maximized.

An operation of the apparatus for manufacturing a drink illustrated in FIGS. 2 to 6 will be described in detail with reference to FIG. 7.

Figure 7:
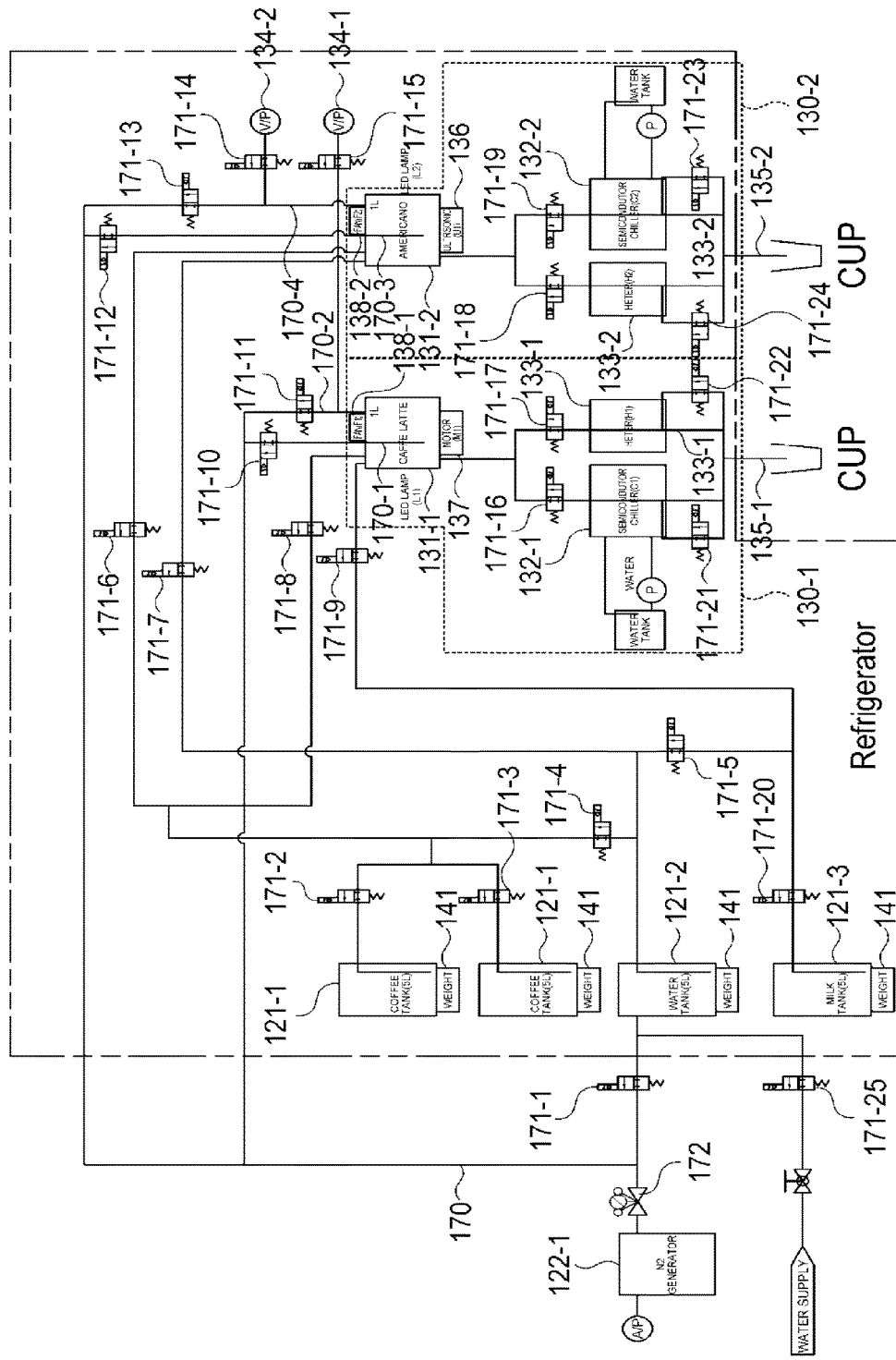
FIG. 7 is a P&ID diagram in the case in which the apparatus for manufacturing a drink according to an exemplary embodiment of the present invention is implemented by an apparatus for manufacturing coffee.

FIG. 7 is a P&ID diagram in the case in which the apparatus for manufacturing a drink according to an exemplary embodiment of the present invention is implemented by an apparatus for manufacturing coffee. Referring to FIG.

7, the apparatus for manufacturing coffee may include the material storing unit 120 storing the materials for manufacturing the drink therein, the material storing unit 120 may include the undiluted coffee solution storage 121-1, the water storage 121-2, the milk storage 121-3, and the nitrogen gas generator 122-1.

In addition, the material storing unit 120 may be connected to the drink manufacturing unit 130 through the pipes 170. That is, the pipes 170 may form the connection paths for transferring the materials stored in the material storing unit 120 to the mixing tank 131 of the drink manufacturing unit 130. In FIG. 7, solid lines connecting the respective components to each other indicate the pipes.

In addition, a regulator 172 for uniformly discharging the nitrogen gas generated in the nitrogen gas generator 122-1 at a constant pressure may be installed in the pipes 170.

In addition, valves 171-1 to 171-25 controlling each of the plurality of connection paths to be opened or closed may be formed in the pipes 170. Here, the valves 171-1 to 171-25 may be implemented by a solenoid valve as an example.

In addition, the material storing unit sensing sensor 141 sensing a weight may be installed in each of the undiluted coffee solution storage 121-1, the water storage 121-2, and the milk storage 121-3. In this case, data sensed in the material storing unit sensing sensor 141 may be used to detect whether or not the material storing unit 120 is installed and states of the stored materials (for example, how much the material remains).

Meanwhile, the apparatus for manufacturing coffee illustrated in FIG. 7 may include a first drink manufacturing unit 130-1 for manufacturing coffee that uses milk as a material (for example, latte) and a second drink manufacturing unit 130-2 for manufacturing coffee that does not use the milk as a material (for example, Americano, nitro coffee, or the like).

The first drink manufacturing unit 130-1 may include a first mixing tank 131-1, a first chiller 132-1, a first heater 133-1, a first vacuum pump 134-1, a first drink outlet 135-1, a mixer 137, and a first cooler 138-1. Here, the first vacuum pump 134-1 may be connected to a material accommodating space of the first mixing tank 131-1 to generate vacuum in the material accommodating space. In addition, the first mixing tank 131-1 may be connected to the undiluted coffee solution storage 121-1, the water storage 121-2, the milk storage 121-3, and the nitrogen gas generator 122-1, and may receive an undiluted coffee solution, water, milk, and a nitrogen gas from each of the undiluted coffee solution storage 121-1, the water storage 121-2, the milk storage 121-3, and the nitrogen gas generator 122-1. In addition, the mixer 137 may help the materials stored in the material accommodating space of the first mixing tank 131-1 be mixed with each other using a torque by a motor. In addition, the first chiller 132-1 or the first heater 133-1 may be selectively operated whether a drink ordered by the customer is an iced drink or a hot drink, and may manufacture a drink corresponding to the customer's order. In addition, the first drink outlet 135-1 may discharge the manufactured drink to the cup 200.

In addition, the second drink manufacturing unit 130-2 may include a second mixing tank 131-2, a second chiller 132-2, a second heater 133-2, a second vacuum pump 134-2, an ultrasonic generator 136, a second drink outlet 135-2, and a second cooler 138-2. Here, the second vacuum pump 134-2 may be connected to a material accommodating space of the second mixing tank 131-2 to generate vacuum in the material accommodating space. In addition, the second mixing tank 131-2 may be connected to the undiluted coffee solution storage 121-1, the water storage 121-2, and the nitrogen gas generator 122-1, and may receive an undiluted coffee solution, water, and a nitrogen gas from each of the undiluted coffee solution storage 121-1, the water storage 121-2, and the nitrogen gas generator 122-1. In addition, the ultrasonic generator 136 may generate ultrasonic waves to help the nitrogen be mixed with other materials. In addition, the second chiller 132-2 or the second heater 133-2 may be selectively operated whether a drink ordered by the customer is an iced drink or a hot drink, and may manufacture a drink corresponding to the customer's order. In addition, the second drink outlet 135-2 may discharge the manufactured drink to the cup 200.

Meanwhile, according to an exemplary embodiment of the present invention, two or more pipes may be used in order to transfer a nitrogen gas to the mixing tank 131. In detail, a 1-1-th pipe 170-1 and a 1-2-th pipe 170-2 may be connected to the first mixing tank 131-1 to transfer the nitrogen gas generated in the nitrogen gas generator 122-1 to the first mixing tank 131-1. In addition, a 2-1-th pipe 170-3 and a 2-2-th pipe 170-4 may be connected to the second mixing tank 131-2 to transfer the nitrogen gas generated in the nitrogen gas generator 122-1 to the second mixing tank 131-2.

Here, the 1-1-th pipe 170-1 and the 2-1-th pipe 170-3 may be extended into the mixing tanks 131-1 and 131-2, respectively, in order to supply nitrogen into liquids accommodated in the mixing tanks 131-1 and 131-2. In addition, the 1-2-th pipe 170-2 and the 2-2-th pipe 170-4 may be connected to the mixing tanks 131-1 and 131-2, respectively, in order to supply a nitrogen gas to surfaces of the liquids accommodated in the mixing tanks 131-1 and 131-2. In this case, the nitrogen gas transferred through the 1-1-th pipe 170-1 and the 2-1-th pipe 170-3 may be supplied into the liquids, and the nitrogen gas transferred through the 1-2-th pipe 170-2 and the 2-2-th pipe 170-4 may be supplied to the surfaces of the liquids to apply a pressure to the surfaces of the liquids. That is, since nitrogen is not substantially dissolved in the liquid, in the case of manufacturing the drink using nitrogen as a material according to the related art, it is difficult to secure quality of the drink, but according to the present invention, the nitrogen gas may be simultaneously supplied to inner and outer sides of the liquids to improve quality of a drink that uses nitrogen as a material.

Figure 8:
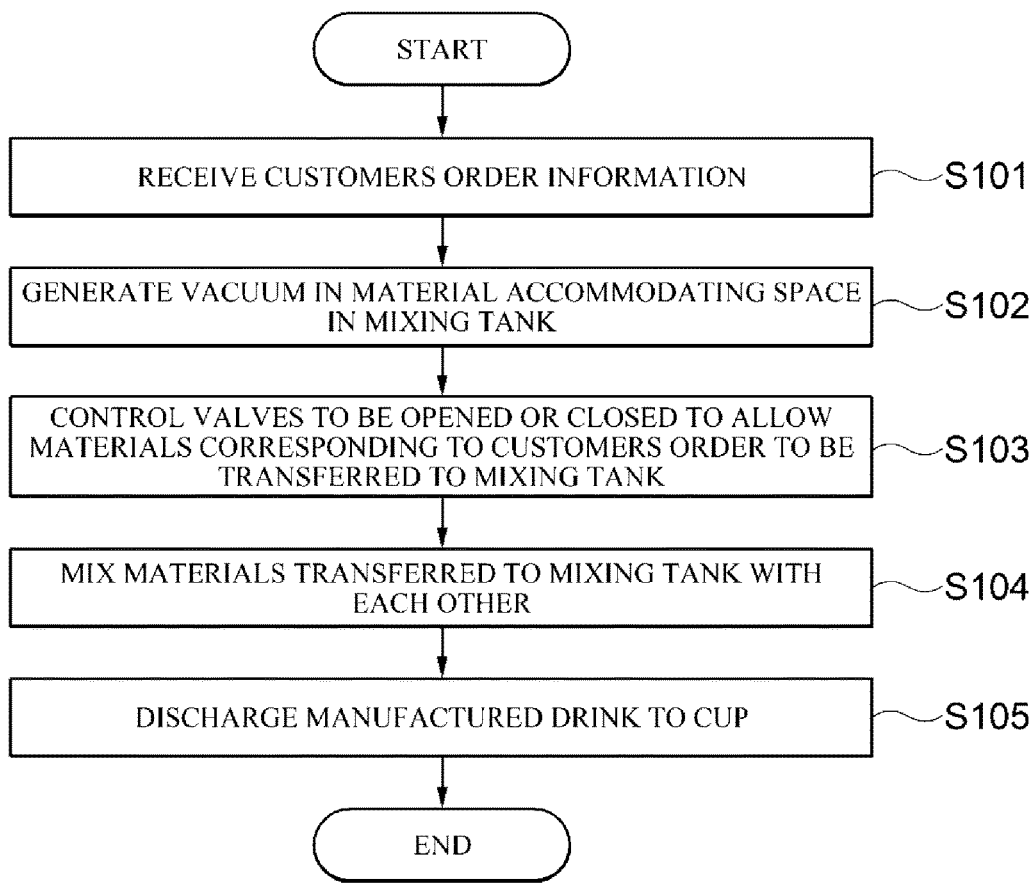
FIG. 8 is a flow chart for describing a method for manufacturing a drink according to an exemplary embodiment of the present invention.

FIG. 8 is a flow chart for describing a method for manufacturing a drink according to an exemplary embodiment of the present invention. Referring to FIG. 8, the customer's order information may be first received (S101).

In addition, vacuum may be generated in the material accommodating space in the mixing tank 131 for manufacturing the drink corresponding to the customer's order information (S102). As an example, in the apparatus illustrated in FIG. 7, in the case in which the customer orders nitro coffee, a valve 171-4 connected to the vacuum pump 134-2 may be opened, and the vacuum pump 134-2 may be operated to generate the vacuum in the material accommodating space in the second mixing tank 131-2.

In addition, valves for manufacturing the drink among a plurality of valves 171 installed in the pipes 170 may be controlled to be opened or closed to allow materials corresponding to the customer's order to be transferred to the mixing tank 131 (S103). In detail, when the liquid storage 121 sprays a liquid to the pipes through nozzles or the gas generator 122 sprays a gas to the pipes through nozzles, the sprayed liquid and/or gas may be transferred to the mixing tank 131 through the pipes 170 depending on a pressure difference therebetween. As an example, in the apparatus as illustrated in FIG. 7, in the case in which the customer orders the nitro coffee, valves 171-12 and 171-13 installed in pipes for transferring the nitrogen gas may be opened, valves 171-2 and 171-6 installed in pipes for transferring the undiluted coffee solution may be opened, and valves 171-20 and 171-5 installed in pipes for transferring the water may be opened to control the undiluted coffee solution, the water, and the nitrogen gas to be transferred to the mixing tank 131.

In addition, the materials transferred to the mixing tank 131 may be mixed with each other in the material accommodating space (S104). As an example, in the apparatus as illustrated in FIG. 7, in the case in which the customer orders the nitro coffee, the ultrasonic generator 136 may transfer the ultrasonic waves to the materials stored in the material accommodating space of the mixing tank 131, which may help nitrogen be dissolved in other materials.

In addition, the drink outlet 135 may discharge the manufactured drink to the cup 200 (S105). As an example, in the apparatus as illustrated in FIG. 7, in the case in which the customer orders iced nitro coffee, a valve 171-19 may be opened to provide the nitro coffee manufactured in the mixing tank 131-2 to the chiller 132-2, and the nitro coffee passing through the chiller may pass through a valve 171-23 and be then discharged to the cup.

Figure 9:
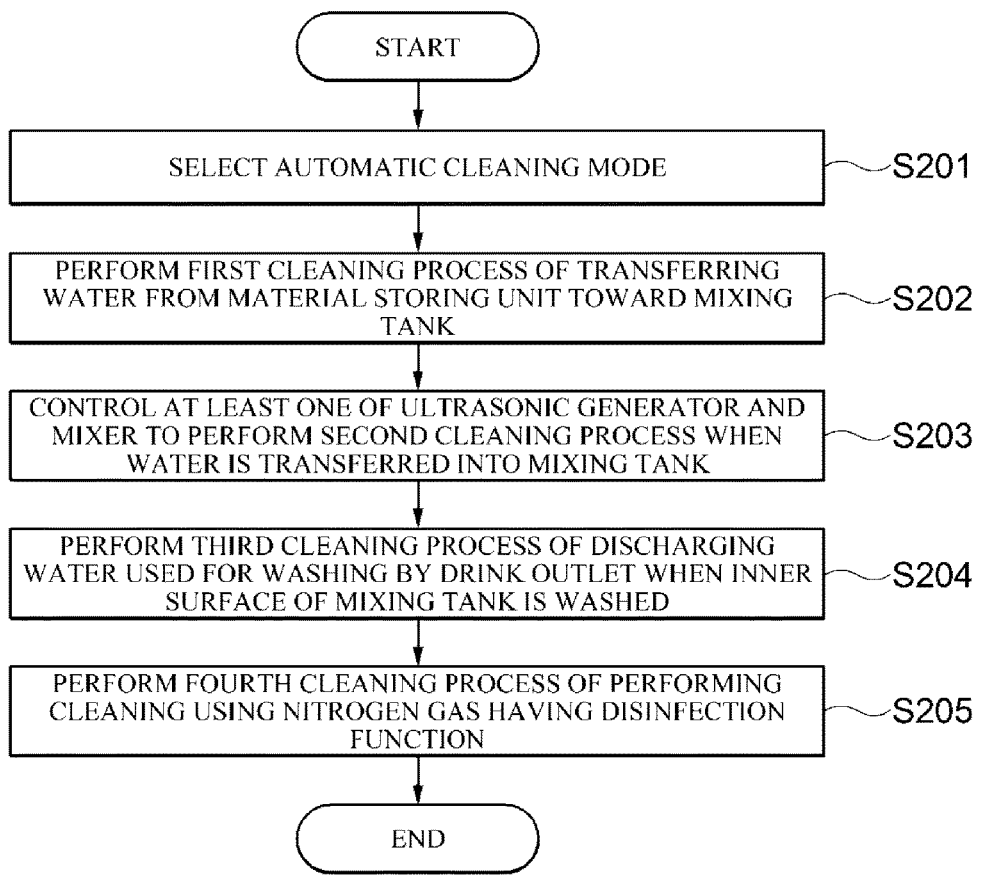
FIG. 9 is a flow chart for describing an automatic cleaning mode according to an exemplary embodiment of the present invention.

FIG. 9 is a flow chart for describing an automatic cleaning mode according to an exemplary embodiment of the present invention. Referring to FIG. 9, the automatic cleaning mode may be first selected (S201). In addition, when the automatic cleaning mode is selected, the first cleaning process of transferring the water stored in the material storing unit 120 from the material storing unit 120 toward the mixing tank 131 may be performed. As an example, in the apparatus as illustrated in FIG. 7, in order to perform the first cleaning process, the controlling unit 150 may control valves 171-4, 171-6, and 171-8 formed in the paths of the water to be opened, and control inner portions of the mixing tanks 131-1 and 132-2 to be vacuum, thereby making it possible to allow the water to be transferred toward the mixing tanks 131-1 and 131-2. Therefore, the water may be transferred from the water storing unit 121-2 into the mixing tanks 131-1 and 131-2.

In addition, when the water is transferred into the mixing tanks 131 depending on the first cleaning process, the controlling unit 150 may control at least one of the ultrasonic generator 136 and the mixer 137 to allow the second cleaning process to be performed (S202). As an example, in the apparatus as illustrated in FIG. 7, in order to perform the second cleaning process, the ultrasonic generator 136 may apply the ultrasonic waves to the water transferred to the mixing tank 131-2. In this case, micro-bubbles may be generated in the water. These micro-bubbles may generate strong energy while being grown and destroyed, and an inner surface of the mixing tank 131-2 held in the water may be washed by this shock wave. In addition, when the water for the cleaning is transferred into the mixing tank 131-1, the mixer 137 may apply a torque generated depending on rotation of the motor to the water. In this case, the water may clean the inner surface of the mixing tank 131-1 held in the water while being rotated around a predetermined region.

Meanwhile, when the inner surfaces of the mixing tanks 131 are washed depending on the second cleaning process, the controlling unit 150 may perform a control to perform the third cleaning process of discharging the water used for the cleaning (S203). As an example, in the apparatus as illustrated in FIG. 7, in order to perform the third cleaning process, the controlling unit 150 may control valves 171-16, 171-17, 171-21, and 171-22 formed in drink discharging paths of the first drink manufacturing unit to be opened, and control the first chiller 132-1 and the first heater 133-1 not to be operated. In addition, the controlling unit 150 may control valves 171-18, 171-19, 171-23, and 171-24 formed in drink discharging paths of the second drink manufacturing unit to be opened, and control the second chiller 132-2 and the second heater 133-2 not to be operated. Therefore, the water used for the washing may be discharged to the outside.

In addition, when the water used for the cleaning is discharged depending on the third cleaning process, the controlling unit 150 may perform a control to perform the fourth cleaning process of cleaning the pipes 170 and the drink manufacturing unit 130 using a nitrogen gas having a disinfection function (S204). As an example, in the apparatus as illustrated in FIG. 7, in order to perform the fourth cleaning process, the controlling unit 150 may control valves formed in pipes that need to be cleaned to be opened.

In the case in which cleaning is performed on pipes corresponding to paths of the undiluted coffee solution, the water, the milk, and the nitrogen gas, the controlling unit 150 may control the vacuum pumps 134-1 and 134-2 to allow inner portions of the mixing tanks 131 to be vacuum, and control valves 171-12, 171-13, 171-10, and 171-11 to be opened to allow the nitrogen gas to be transferred from the nitrogen gas generator 122-1 toward the mixing tanks 131 through the pipes 170. Then, the controlling unit 150 may control the vacuum pumps 134-1 and 134-2 to apply a pressure to the inner portions of the mixing tanks 131, and control valves 171-8, 171-9, 171-6, and 171-7 to be opened to allow the nitrogen gas to be transferred from the mixing tanks 131 to the liquid storage 121 through the pipes 170. Then, the controlling unit 150 may control the vacuum pumps 134-1 and 134-2 to allow the inner portions of the mixing tanks 131 to be vacuum, thereby making it possible to allow the nitrogen gas used for disinfection to be collected in the mixing tanks 131 through the pipe 170. Then, the controlling unit 150 may control valves 171-16, 171-17, 171-21, and 171-22 formed in the drink discharging paths of the first drink manufacturing unit to be opened, and control the first chiller 132-1 and the first heater 133-1 not to be operated. In addition, the controlling unit 150 may control valves 171-18, 171-19, 171-23, and 171-24 formed in drink discharging paths of the second drink manufacturing unit to be opened, and control the second chiller 132-2 and the second heater 133-2 not to be operated. Therefore, the nitrogen gas used for the disinfection may be discharged to the outside.

In addition, the controlling unit 150 may control the related components to sequentially and repeatedly perform the first cleaning process (S201), the second cleaning process (S202), the third cleaning process (S203), and the fourth cleaning process (S204).

The existing scheme should depend on determination of a worker (a manufacturer) for several reasons (for example, a kind and a size of coffee) after a customer's order, while the apparatus for manufacturing a drink according to the present invention may completely respond to the customer's order by one click.

In addition, in the existing scheme, a separate work and an additional apparatus are required depending on a kind and a size of ordered coffee. However, the apparatus for manufacturing coffee according to the present invention may automatically manufacture coffee ordered by a customer by one click without using an additional apparatus.

In addition, in the existing scheme, quality (taste) and a quantity are changed depending on states (health, a body size, sex, and the like) of a worker, skills of the worker, and a manufacturing environment, such that quality management and manufacturing management are difficult and an additional apparatus is required at the time of performing a work. However, the apparatus for manufacturing coffee according to the present invention automatically controls a kind and a size of coffee, and minimizes a variable of a manufacturing environment in a special manufacturing scheme, thereby making it possible to manufacture coffee of which quality is always constant.

In addition, in the existing scheme, an additional apparatus is required depending on a kind of ordered coffee. However, the apparatus for manufacturing coffee according to the present invention may manufacture various kinds of coffee without using an additional apparatus.

In addition, in the existing scheme, a separate manufacturer is required in order to manufacture a drink ordered by the customer, a manufacturing time is increased depending on a kind and a size of coffee, and manufacturing errors (an error in a kind of coffee, an error in a size of coffee, and the like) occur, such that a manufacturing cost is increased. However, the apparatus for manufacturing coffee according to the present invention automatically manufactures ordered coffee by one click to minimize the manufacturing errors, thereby making it possible to significantly decrease a manufacturing cost as compared with the existing scheme.

In addition, in the existing scheme, disassembling and assembling processes of a machine should be performed in order to wash the machine, and a fault may thus occur due to an assembling defect, or the like, at the time of reassembling the machine, which may lead to suspension of sale, thereby hurting sales, and a machine that may not be disassembled is washed by a person using a brush, and it is thus difficult to precisely wash the machine, resulting in a sanitary problem. However, in the apparatus for manufacturing coffee according to the present invention, when the automatic cleaning mode is selected, precise automatic washing may be executed to secure continuous sanitation, and an equipment does not need to be disassembled and assembled, such that durability of the equipment may be maximized.

In addition, in the existing scheme, a separate gas tank needs to be provided in a store in order to manufacture nitro coffee, and a Freon gas for instantaneous cooling needs to be used in order to manufacture nitro coffee such as cold brew coffee, such that the manufacturer may be always exposed to a risk. However, in the apparatus for manufacturing coffee according to the present invention, a function of a gas tank is replaced by a special equipment, a refrigerant for cooling is not used, such that continuous stability may be secured, and separate management except for simple management (replacement of a filter) is not required.

Meanwhile, although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. An apparatus for manufacturing a drink, the apparatus comprising:
   an input unit receiving customer's order information;
   a material storing unit storing materials for manufacturing the drink therein;
   a drink manufacturing unit including a mixing tank receiving the materials stored in the material storing unit and mixing the received materials with each other;
   a drink outlet discharging the drink manufactured in the drink manufacturing unit;
   pipes forming connection paths for transferring the materials stored in the material storing unit to the drink manufacturing unit;
   valves formed in the pipes;
   a vacuum pump connected to the mixing tank of the drink manufacturing unit to generate vacuum in a material accommodating space formed in the mixing tank; and
   a controlling unit controlling the valves and the vacuum pump on the basis of the customer's order information input to the input unit to allow materials corresponding to a customer's order to be transferred to the mixing tank,
   wherein the material storing unit includes:
   a liquid storage storing at least one liquid for manufacturing the drink therein; and
   a gas generator generating at least one of a nitrogen gas and an oxygen gas, and
   a regulator is installed at a discharging end of the gas generated in the gas generator.

2. The apparatus for manufacturing a drink of claim 1, wherein the liquid includes at least one of an undiluted coffee solution, water, milk, beer, and juice.

3. The apparatus for manufacturing a drink of claim 1, further comprising a material storing unit sensing sensor formed at a lower end of the material storing unit and sensing a weight of the material storing unit,
   wherein the controlling unit generates a notifying signal notifying a user of whether or not the material storing unit is installed and states of the stored materials on the basis of sensed data of the material storing unit sensing sensor.

4. The apparatus for manufacturing a drink of claim 1, further comprising a cup sensing sensor generating sensed data on a cup holding the drink manufactured in the drink manufacturing unit,
   wherein the controlling unit generates a notifying signal notifying a user of whether or not the cup is put in the drink outlet and a size of the put cup on the basis of the data sensed in the cup sensing sensor.

5. The apparatus for manufacturing a drink of claim 1, further comprising a barcode sensor reading a barcode attached to a cup to generate sensed data,
   wherein the controlling unit determines a kind and a size of drink ordered by a customer on the basis of the data sensed in the barcode sensor, and controls the drink manufacturing unit to manufacture the drink corresponding to the customer's order.

6. The apparatus for manufacturing a drink of claim 1, wherein when the apparatus for manufacturing a drink is implemented by an apparatus for manufacturing coffee, the drink manufacturing unit includes a first drink manufacturing unit that uses milk as a material and a second drink manufacturing unit that does not use the milk as a material.

7. The apparatus for manufacturing a drink of claim 1, wherein the drink manufacturing unit includes at least one of
   an ultrasonic generator transferring ultrasonic waves to the materials stored in the material accommodating space of the mixing tank; and
   a mixer mixing the materials stored in the material accommodating space of the mixing tank with each other using a torque by a motor.

8. The apparatus for manufacturing a drink of claim 7, wherein when a customer orders nitro coffee, the controlling unit controls the valves to transfer an undiluted coffee solution, water, and a nitrogen gas to the mixing tank, and controls the ultrasonic generator to provide the ultrasonic waves to the materials stored in the material accommodating space of the mixing tank when the materials are transferred to the mixing tank.

9. The apparatus for manufacturing a drink of claim 7, wherein when an automatic cleaning mode is input through the input unit, the controlling unit
performs a control to perform a first cleaning process of transferring water stored in the material storing unit from the material storing unit toward the mixing tank,
controls at least one of the ultrasonic generator and the mixer to perform a second cleaning process when the water is transferred into the mixing tank,
controls the drink outlet to perform a third cleaning process of discharging water used for washing when an inner surface of the mixing tank is washed depending on the second cleaning process, and
performs a control to perform a fourth cleaning process of disinfecting the pipes and the mixing tank using a nitrogen gas.

10. An apparatus for manufacturing a drink, the apparatus comprising:
an input unit receiving customer's order information;
a material storing unit storing materials for manufacturing the drink therein;
a drink manufacturing unit including a mixing tank receiving the materials stored in the material storing unit and mixing the received materials with each other;
a drink outlet discharging the drink manufactured in the drink manufacturing unit;
pipes forming connection paths for transferring the materials stored in the material storing unit to the drink manufacturing unit;
valves formed in the pipes;
a vacuum pump connected to the mixing tank of the drink manufacturing unit to generate vacuum in a material accommodating space formed in the mixing tank;
a controlling unit controlling the valves and the vacuum pump on the basis of the customer's order information input to the input unit to allow materials corresponding to a customer's order to be transferred to the mixing tank; and
a material storing unit sensing sensor formed at a lower end of the material storing unit and sensing a weight of the material storing unit,
wherein the controlling unit generates a notifying signal notifying a user of whether or not the material storing unit is installed and states of the stored materials on the basis of sensed data of the material storing unit sensing sensor.

11. The apparatus for manufacturing a drink of claim 10, further comprising a cup sensing sensor generating sensed data on a cup holding the drink manufactured in the drink manufacturing unit,
wherein the controlling unit generates a notifying signal notifying a user of whether or not the cup is put in the drink outlet and a size of the put cup on the basis of the data sensed in the cup sensing sensor.

12. The apparatus for manufacturing a drink of claim 10, further comprising a barcode sensor reading a barcode attached to a cup to generate sensed data,
wherein the controlling unit determines a kind and a size of drink ordered by a customer on the basis of the data sensed in the barcode sensor, and controls the drink manufacturing unit to manufacture the drink corresponding to the customer's order.

13. The apparatus for manufacturing a drink of claim 10, wherein when the apparatus for manufacturing a drink is implemented by an apparatus for manufacturing coffee, the drink manufacturing unit includes a first drink manufacturing unit that uses milk as a material and a second drink manufacturing unit that does not use the milk as a material.

14. The apparatus for manufacturing a drink of claim 10, wherein the drink manufacturing unit includes at least one of
an ultrasonic generator transferring ultrasonic waves to the materials stored in the material accommodating space of the mixing tank; and
a mixer mixing the materials stored in the material accommodating space of the mixing tank with each other using a torque by a motor.

15. An apparatus for manufacturing a drink, comprising:
an input unit receiving customer's order information;
a material storing unit storing materials for manufacturing the drink therein;
a drink manufacturing unit including a mixing tank receiving the materials stored in the material storing unit and mixing the received materials with each other;
a drink outlet discharging the drink manufactured in the drink manufacturing unit;
pipes forming connection paths for transferring the materials stored in the material storing unit to the drink manufacturing unit;
valves formed in the pipes;
a vacuum pump connected to the mixing tank of the drink manufacturing unit to generate vacuum in a material accommodating space formed in the mixing tank; and
a controlling unit controlling the valves and the vacuum pump on the basis of the customer's order information input to the input unit to allow materials corresponding to a customer's order to be transferred to the mixing tank,
wherein the drink manufacturing unit includes at least one of
an ultrasonic generator transferring ultrasonic waves to the materials stored in the material accommodating space of the mixing tank; and
a mixer mixing the materials stored in the material accommodating space of the mixing tank with each other using a torque by a motor.

16. The apparatus for manufacturing a drink of claim 15, wherein when a customer orders nitro coffee, the controlling unit controls the valves to transfer an undiluted coffee solution, water, and a nitrogen gas to the mixing tank, and controls the ultrasonic generator to provide the ultrasonic waves to the materials stored in the material accommodating space of the mixing tank when the materials are transferred to the mixing tank.

17. The apparatus for manufacturing a drink of claim 15, wherein when an automatic cleaning mode is input through the input unit, the controlling unit
performs a control to perform a first cleaning process of transferring water stored in the material storing unit from the material storing unit toward the mixing tank,
controls at least one of the ultrasonic generator and the mixer to perform a second cleaning process when the water is transferred into the mixing tank,
controls the drink outlet to perform a third cleaning process of discharging water used for washing when an inner surface of the mixing tank is washed depending on the second cleaning process, and performs a control to perform a fourth cleaning process of disinfecting the pipes and the mixing tank using a nitrogen gas.

18. The apparatus for manufacturing a drink of claim 15, wherein when the apparatus for manufacturing a drink is implemented by an apparatus for manufacturing coffee, the drink manufacturing unit includes a first drink manufacturing unit that uses milk as a material and a second drink manufacturing unit that does not use the milk as a material.

19. An apparatus for manufacturing a drink, the apparatus comprising:
    an input unit receiving customer's order information;
    a material storing unit storing materials for manufacturing the drink therein;
    a drink manufacturing unit including a mixing tank receiving the materials stored in the material storing unit and mixing the received materials with each other;
    a drink outlet discharging the drink manufactured in the drink manufacturing unit;
    pipes forming connection paths for transferring the materials stored in the material storing unit to the drink manufacturing unit;
    valves formed in the pipes;
    a vacuum pump connected to the mixing tank of the drink manufacturing unit to generate vacuum in a material accommodating space formed in the mixing tank; and
    a controlling unit controlling the valves and the vacuum pump on the basis of the customer's order information input to the input unit to allow materials corresponding to a customer's order to be transferred to the mixing tank,
    wherein when the apparatus for manufacturing a drink is implemented by an apparatus for manufacturing coffee, the drink manufacturing unit includes a first drink manufacturing unit that uses milk as a material and a second drink manufacturing unit that does not use the milk as a material.

* * * * *